Jan. 26, 1971  C. E. STUART  3,557,455
ADJUSTABLE AND REUSABLE DENTAL CLUTCH FORMER
Filed July 22, 1968
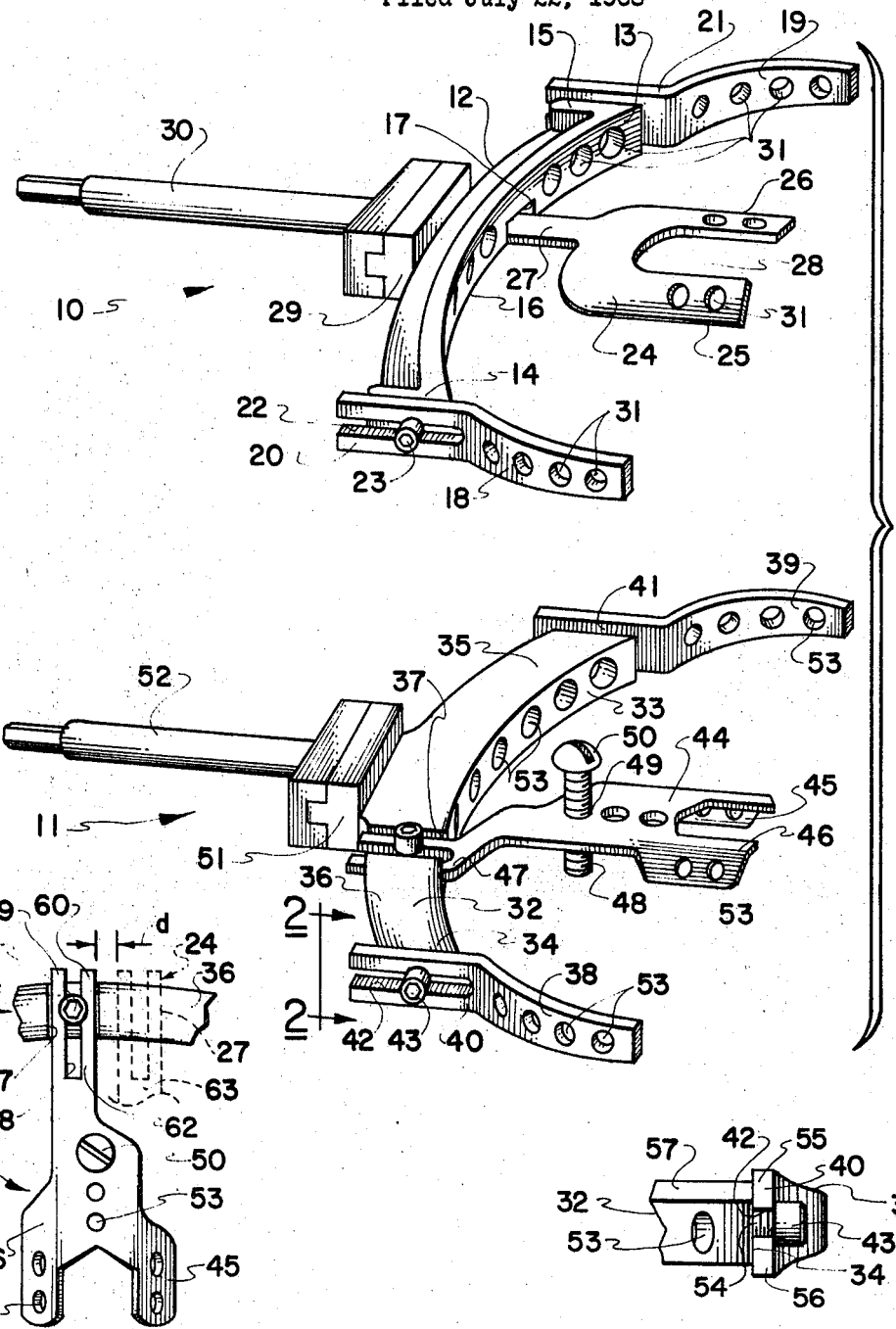
FIG. 1
FIG. 2
FIG. 3
FIG. 4
INVENTOR:
CHARLES EDWARD STUART
BY
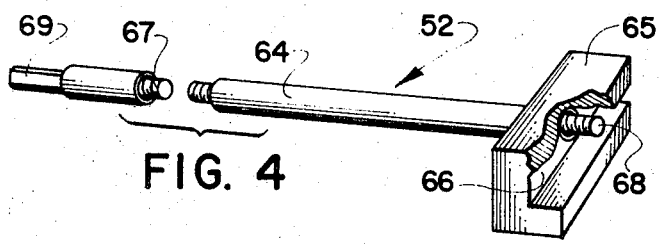
ATTORNEYS.

United States Patent Office 3,557,455
Patented Jan. 26, 1971

3,557,455
ADJUSTABLE AND REUSABLE DENTAL
CLUTCH FORMER
Charles Edward Stuart, P.O. Box 891,
Ventura, Calif. 91401
Filed July 22, 1968, Ser. No. 746,503
Int. Cl. A61c 9/00
U.S. Cl. 32—20        9 Claims

ABSTRACT OF THE DISCLOSURE

A dental clutch former includes mutually adjustable components that can easily be assembled as a framework for constructing a dental clutch insertable into a patient's mouth in order to obtain jaw movement information for assisting in rehabilitating the patient's mouth. The clutch former has a removable front section with an arcuate surface positionable adjacent the anterior region of the patient's teeth and a pair of longitudinally slidable side railings attached to opposing sides of the front section. A center bearing plate is slidably connected to the front section. In order to quickly and painlessly remove the dental clutch from the patient's mouth, the front section is first slid and pivoted away from the other components and then the other components are removed from the patient's mouth. Rather than being thrown away, the components are saved for constructing other dental clutch formers for different patients with varying jaw sizes.

This invention relates to dental equipment for obtaining jaw movement information and more specifically to adjustable dental clutch formers used in constructing dental clutches to fit a particular dental patient's jaw.

BACKGROUND OF THE INVENTION

A well established technique for deriving dental information concerning a patient's jaw movements is to employ dental clutches. A dental clutch is an attachment device for providing firm and rigid connection to the dental patient's mandible (lower jaw) or maxilla (upper jaw). Ordinarily the clutch is attached directly to the lower teeth or upper teeth for the purpose of recording the necessary information. Studs extending from the clutch formers are clamped in recording devices that record jaw movement information that can be subsequently analyzed by the dentist.

Presently employed clutch formers are ordinarily aluminum or plastic throw-away units of varying standard sizes. A clutch former of this type is used as a framework for building a clutch. A standard size clutch former is selected corresponding with a particular patient's jaw dimentions which can be measured from mandibular and maxilla cast models. The cast models may be arranged in a dental articulator of a kind shown in my co-pending application Ser. No. 582,833, filed Sept. 29, 1966, and entitled "Articulator Guide." An articulator is a diagnostic recording instrument capable of duplicating or simulating relative jaw motions.

After the properly sized clutch former is selected, a relatively quick setting moldable plastic compound of doughey consistency is deposited on the clutch former. The impressions of the dental patient's teeth are then established in the plastic compound by placing the clutch formers in the dental articulator and closing the simulated jaws corresponding to the particular patient. When this is accomplished, a suitable adhesive paste such as zinc oxide is brushed onto the cured impression of the patient's teeth and then the person's teeth are fitted into the impressions enabling the paste to hold the person's teeth and the clutches together as a unit. Jaw movement can then be transmitted from the clutches through the attached studs to the recording device.

Unless conventional aluminum clutch formers are divided into separable sections by sawing for example before the moldable plastic compound sets, any attempt to remove the clutch from the patient's mouth after all of the necessary information has been obtained is painful and injurious to the patients mouth. Therefore it is customary in the case of cast aluminum clutch formers to saw through sections of the clutch former in the laboratory before depositing the moldable plastic upon the clutch former. Then sections of the clutch can be broken away to liberate the person's teeth from the clutch with relatively slight pain. It is time consuming for the dentist to select a properly sized unitary conventional clutch corresponding to the patient's jaw size and then partially saw or otherwise cut sections of the unitary clutch.

Another disadvantage of conventional clutches is that as they are being withdrawn from the patient's mouth they usually become destroyed and must be tossed away. In those rare situations where they do not become completely destroyed and can be repaired, they are adaptable only to that particular patient's mouth. Therefore most dental clutch formers are of the single-use, throw-away type.

Another type of unitary cast clutch former is constructed of resilient plastic which is easier to withdraw from the patient's mouth but cannot establish the necessary rigidity with the patient's mouth so that proper and accurate jaw movement readings cannot be achieved.

BRIEF SUMMARY OF THE INVENTION

Briefly stated, the present invention comprehends a dental clutch former insertable into a patient's mouth to assist in obtaining medical information such as jaw movements, tooth geometry, meshing relationship between upper and lower teeth etc. The clutch former includes a front section having an arcuate surface positionable near the anterior portion of the patient's teeth and a pair of laterally spaced side railings that extend forwardly of the arcuate surface. The side railings are connected to the front section by connection means that permits the front section to be easily detached from the side railings to facilitate removing the clutch former from the patient's mouth as painlessly and quickly as possible. Extending forwardly between the side railings is a center bearing plate which is longitudinally slidable relative to the front section so that the dental clutch former can be adjusted to the patient's jaw dimensions. In accordance with one construction, a rearward section of the center bearing plate is arranged in a groove formed in the front section, the groove being arranged to guide the slidable movement of the center bearing plate.

Preferably the connection means allows the side railings to be longitudinally slid and angularly adjusted relative to the front section so the clutch former can be adjusted to the patient's jaw dimensions. In accordance with one construction for promoting slidable movement of the side railings the connection means is characterized by guide slots formed in rearward portions of the side railings and fasteners for holding the side railings firmly against opposing sides of the front section. The fasteners pass through the guide slots so that when tension of the fasteners is sufficiently relaxed the side railings can be pivoted on and longitudinally slid along the fasteners.

The rearward side of the front section includes a mounting block for being detachable connected to a removable stud used to fix the position of the dental clutch former relative to a corresponding dental clutch former. In order to firmly hold moldable plastic which when cured forms an impression of the patient's teeth, a series of retention openings are formed through the front section, side railings, and, center bearing plate. The side railings and center bearing plate are preferably constructed from flexible metal to facilitate their being shaped into conformity with the patient's jaw dimensions.

In accordance with another construction of the present invention, a set of dental clutch formers are provided that are insertable into a patient's mouth to assist in obtaining medical information. An upper dental clutch former includes mutually adjustable front section, side railings, and center bearing plate components, the center bearing plate having a striking plate section with a concave undersurface portion. A lower dental clutch former is similarly formed with mutually adjustable front sections, side railings and center bearing plate components, the center bearing plate having a height adjustment element for engaging the concave undersurface portion in order to regulate the vertical distance between the upper and lower dental clutch formers. Rearward sections of the upper and lower center bearing plates are laterally offset from one another so that the clutch formers can be brought into close proximity with one another.

After the clutch formers have been developed into clutches and rigidly secured to the patient's upper and lower jaws, they may be used in obtaining medical information. To remove the clutches from the person's mouth, the fasteners joining the center bearing plates and side railings to the upper and lower front sections are loosened so that the front sections can be withdrawn. Then the remaining clutch segments are withdrawn. The components are saved and can be used once again for the same or a different patient after the plastic material has been removed.

BRIEF DESCRIPTION OF THE DRAWINGS

The numerous benefits and unique aspects of the present invention will be fully understood when the following detailed description is studied in conjunction with the drawings, in which:

FIG. 1 is a perspective view showing upper and lower dental clutch formers arranged in vertically spaced relationship.

FIG. 2 is a fragmentary view taken along line 2—2 of FIG. 1 showing how the side railing is adjustably connected to the front section.

FIG. 3 is a fragmentary plan view showing the upper center bearing plate in dashed lines superimposed over the lower center bearing plate, the plates being offset from one another.

FIG. 4 is a perspective fragmentary view showing a removable stud.

DETAILED DESCRIPTION OF THE PREFERRED EMBODIMENTS

Referring now to FIG. 1, an upper dental clutch former 10 and a lower dental clutch former 11 are shown. Upper clutch former 10 constitutes the framework for a dental clutch attachable to a patient's maxilla or upper jaw and, in a similar manner, lower dental clutch former 11 constitutes the framework for a dental clutch attachable to a patient's mandible or lower jaw. As shall be fully explained clutch formers 10 and 11 are constructed of mutually adjustable components that can be easily assembled and adjusted to assist in shaping the clutches to perfectly conform with a particular patient's upper jaw and lower jaw dimensions. After being removed from the patient's mouth the clutch formers, rather than being thrown away as is customary in the case of conventional clutch formers, can be easily disassembled and shaped to accommodate the varying jaw shapes of different patients.

Upper dental clutch former 10 includes a front section 12 having an arcuate surface 13 which, when the clutch is fully formed, is positionable adjacent the anterior section of the patient's upper teeth. Front section 12 has opposing sides 14 and 15, a bottom surface 16 and a transverse groove 17 whose function will be described. Arranged against front section sides 14 and 15 is a pair of laterally spaced, forwardly extending side railings 18 and 19 constructed of any suitable flexible metal. The rearward ends 20 and 21, respectively, of side railings 18 and 19 are adjustably secured against front section sides 14 and 15. Since both side railings 18 and 19 are identically secured to front section 12, a description of side railing 18 will suffice for both. Rearward end 20 is formed with a longitudinally extending guide slot 22 through which a fastener 23 extends. Fastener 23 is formed with an enlarged head whose width exceeds the width of slot 22 so that when fastener 23 is sufficiently loosened, side railing 18 can be slid back and forth and pivoted up and down until the proper adjustment has been accomplished. The coaction between slot 22, fastener 23 and an internally threaded recess (not shown) formed in side 14 constitute connection means for connecting side railing 18 to front section 12.

Extending forwardly between side railings 18 and 19 is a center bearing plate 24 having a pair of spaced flexible arms 25 and 26. Center bearing plate 24 includes a relatively narrow, flexible stem 27 that fits in sliding engagement within transverse groove 17 that serves to guide the sliding motion of plate 24. Plate 24 includes a striking plate section 28 formed with a concave undersurface portion whose function will be described.

Fixed to the rearward side of front section 12 is a mounting block 29 shaped for detachable connection with a removable stud 30. A series of retention openings are formed in front section 12, side railings 18 and 19 and center bearing plate 24 for the purpose of holding moldable plastic while it is being cured into the desired clutch shape conforming to the patient's upper jaw.

In a similar manner, lower dental clutch former 11 has a front section 32 formed with an arcuate surface 33, opposing sides 34 and 35 and a top surface 36. A transverse groove 37 is formed across top surface 36 for a purpose to be described. A pair of side railings 38 and 39 with rearward ends 40 and 41 are adjustably held against sides 34 and 35. Rearward end 40 has a guide slot 42 enabling railing 38 to be slid back and forth over and pivoted upon a fastener 43 having an enlarged head.

Extending forwardly between side railings 38 and 39 is a lower center bearing plate 44 divided at its forward section into flexible spaced arms 45 and 46. A rearwardly extending narrow stem 47 fits into transverse groove 37 where it may be slid back and forth and tightened. A height adjustment screw 48 extends through a threaded opening 49 in plate 44. Screw 48 has a head 50 shaped to engage the concave undersurface of striking plate section 28 in order to maintain the necessary vertical distance between the upper and lower dental clutch formers.

Secured to the rearward end of front section 32 is a mounting block 51 provided with a removable stud 52. A series of retention openings 53 are formed in side railings 38 and 39, bearing plate 44 and front section 32 for the same purpose that retention openings 31 are formed in upper dental clutch former 10.

Referring now to FIG. 2, it can be seen that fastener 43 has a threaded section 54. The diameter of the enlarged head part of fastener 43, which serves as a pivot pin, exceeds the width of guide slot 42. It will be noted that guide slot 42 divides rearward end 40 into a pair of fingers 55 and 56. When side railing 38 has been slid sufficiently forwardly or rearwardly and has been sufficiently angularly oriented, then the enlarged head of fastener 43 is tightened against fingers 55 and 56 as threaded section 54 is inserted into a threaded recess (not shown) within side 34. A retention opening 53 is shown extending through a portion of front section 32 immediately below a relatively narrow, flat upper wall 57.

FIG. 3 is a plan view showing how stem 47 of lower center bearing plate 44 and stem 27 (shown in dashed lines) of upper center bearing plate 24 are offset by a distance $d$. If stems 27 and 47 were vertically aligned or overlapped, then such arrangement would prevent the upper and lower clutches from being brought into close proximity with one another.

Stem 47 is divided by a locking groove 58 into a pair of locking fingers 59 and 60. A fastener 61 with an enlarged head extends through locking groove 58. The width of the enlarged head of fastener 61 exceeds the width of locking groove 58 so that after bearing plate 44 has been slid back or forth by the necessary amount fastener 61 may be torqued to firmly tighten fingers 59 and 60 against front section 32. As previously mentioned, the plate 44 is fabricated from flexible metal so that stem 47 may be bent until height adjustment screw 48 is properly aligned with and spaced from the upper bearing plate. Points 62 and 63 represent the locations where person's lower teeth and upper teeth will contact the dental clutches.

FIG. 4 shows that lower removable stud 52 includes a hollow sleeve 64 and a mounting face 65 formed with a keyway 66 shaped to make complimentary engagement with a corresponding portion of mounting block 51. When removable stud 52 is attached to the lower clutch former, an elongated screw 67 extends through hollow sleeve 64 so that a threaded end 68 can be threaded into an opening in mounting block 51. Threading and unthreading of screw 67 may be accomplished by applying torque to a conventional cap 69.

Before the upper and lower dental clutch formers can be used as frameworks for the construction of clutches to be arranged in the patient's mouth for obtaining medical information to assist in rehabilitating the patient's mouth, a number of preparatory operations some of which are essential must be undertaken. First appropriate mandibular and maxilla cast models of the patient's lower and upper jaws are constructed in accordance with any conventional technique. The cast models are arranged in a dental articulator for simulating the patient's jaw movements. Upper and lower clutch former components are then chosen and assembled together, the components being mutually adjusted and bent to approximately conform with the outlines of the cast models. The clutch formers, now constituting frameworks on which the clutches can be constructed, are then arranged within a holding jig which clamps the removable studs to maintain the clutch formers in the desired spatial relationship.

While fixed in this arrangement masses of pliable filler material such as caulking compound are pressed into the joints where the adjustable side railings and center bearing plates are joined to their corresponding front sections. Molding plastic compound is deposited onto the clutch formers with portions of the plastic compound being extruded through the retention openings. The filler material prevents the plastic compound from flowing into the joints. If the plastic compound were allowed to spread into the joints then when it cured and hardened the joints would become semi-rigid and offer great resistance to the desired quick and easy removal of the front sections. By the foregoing procedure the joints can be easily loosened enabling the front sections to be slid and pivoted away from the other components. Before the moldable plastic compound cures the clutch formers are inserted in the dental articulator where the mandibular and maxilla cast models are penetrated into the moldable plastic compound to form exact impressions of the patient's upper and lower teeth. After the impressions are made but before the plastic compound cures, a knife may be drawn around the arcuate surfaces of the removable front sections to more easily facilitate withdrawing them from the patient's mouth.

When the plastic is cured, a zinc oxide paste or the like is spread over the upper and lower teeth impressions so that when the person's actual teeth enter the impression they become firmly glued to the dental clutches. The clutches then are clamped in a conventional jaw movement recorder which may include a first face bow having a crossbar clamped to one stud and a second face bow having a crossbar clamped to the other stud. The crossbars are aligned generally parallel and each face bow has magnetic styluses and tracing plates which coact with a magnetic styluses and tracing plates associated with the other face bow to record the patient's jaw movements. The recorded movements can then be studied by the dentist in order to ascertain how to accurately rehabilitate the patient's oral imperfection.

When sufficient information has been accumulated, the clutches can be quickly and painlessly removed from the patient's mouth. The removable studs 30 and 52 are unclamped and released from the jaw movement recorder. The elongated screws are then unthreaded from their respective mounting blocks enabling the studs to be separated from mounting blocks 29 and 51. The fasteners securing the side railings and center bearing plates to the front sections are then loosened so that the front sections can be slid and pivoted away from the other clutch portions and removed from the patient's mouth. The remaining parts of the clutch including the side railings and center bearing plates can then also be easily withdrawn from the patient's mouth with minimum irritation to the patient.

After the moldable plastic compound is melted and stripped away, the components of the clutch formers 10 and 11 can be quickly disassembled and made available for the construction of other clutch formers for different patients. It will be appreciated that the clutch former components are interchangeable and replaceable and can be quickly assembled together as a rigid unit to serve as the framework for a dental clutch.

OPERATION

Keeping the above construction in mind it can be understood how many of the previously described disadvantages of prior art dental clutch formers are overcome or substantially eliminated by the present invention.

Assuming that the dental patient's upper and lower jaw cast models have been made, the numerous advantages underlying the present invention can be achieved. Measurements of the cast models are used to assist the dentist in selecting front sections, side railings and center bearing plates. These components are mutually arranged into upper and lower dental clutch frameworks by sliding the side railings back and forth and angularly orienting and bending them, and sliding the center bearing plates back and forth and bending them. Removable studs are then secured to their mounting blocks.

After the moldable plastic has been deposited on the clutch formers to constitute dental clutches and the adhesive paste has been applied to the clutches, they are introduced as a set, at optimum relative spacing, into the dental patient's mouth. When sufficient medical information has been obtained by the jaw movement recorder, the clutches are easily dismantled without hurting or damaging the patient's mouth. First the removable studs are removed and the fasteners joining front sections to the other components are loosened. The front sections are then withdrawn from the patient's mouth. The remaining components held together as upper and lower units by the plastic are then also removed. Rather than throwing the clutch segments away, the plastic is merely melted down and stripped away so that the components can be saved and then reused either for the same or a different patient.

From the foregoing it will be evident that the present invention has provided a reusable and adjustable clutch former in which all of the various advantages are fully realized.

What is claimed is:

1. An adjustable separable and reusable dental clutch former insertable into a patient's mouth to assist in obtaining medical information, comprising:
    (a) an intra-mouth front section for retaining mouldable plastic, the front section having an arcuate surface generally configured like and positionable near the anterior portion of a patient's teeth;
    (b) a pair of intra-mouth side railings for retaining mouldable plastic, the railings extending forwardly of said arcuate surface; and,
    (c) adjustable connection means for connecting the side railings at laterally spaced locations to the front section, the adjustable connection means being arranged to allow longitudinal sliding by the side railings relative to the front section so that the dental clutch former can be adjusted to accommodate the patient's jaw dimensions and further arranged so that the front section can be detached from the side railings to facilitate removing the clutch former from the patient's mouth.

2. The structure according to claim 1, further including a center bearing plate connected to the front section and extending forwardly between the side railings, the center bearing plate being longitudinally slidable to assist in adjusting the dental clutch former dimensions to the patient's jaw dimensions.

3. The structure according to claim 2, in which the front section includes means defining a groove for receiving a rearward section of the center bearing plate, the groove serving as a guideway for the slidable movement of the center bearing plate.

4. The structure according to claim 1, in which the connection means includes means defining guide slots in the rearward portions of the side railings, and,
    fasteners for holding the side railings firmly against opposing sides of the front section, the fasteners passing through the guide slots so that when tension in the fasteners is sufficiently relaxed, the side railings can be angularly adjusted and longitudinally slid along the fasteners.

5. The structure according to claim 1, in which there is provided:
    a mounting block connected to the front section; and
    a removable stud connected to the mounting block for use in fixing the position of the dental clutch former relative to a corresponding dental clutch former.

6. A set of dental clutch formers insertable into a patient's mouth to assist in obtaining medical information, comprising:
    (a) an upper dental clutch former;
    (b) a first front section forming part of the upper dental clutch former;
    (c) a pair of movable side railings removably connected to opposing sides of the first front section, the first front section and first side railings being mutually adjustable to assist in fitting the upper dental clutch former to the patient's upper teeth;
    (d) a first center bearing plate adjustably connected to the first front section and extending forwardly between the first side railings, the plate having a striking plate section with a concave undersurface portion;
    (e) a lower dental clutch former;
    (f) a second front section forming a part of the lower dental clutch former;
    (g) a pair of second movable side railings removably connected to opposing sides of the second front section, the second front section and second side railings being mutually adjustable to assist in fitting the lower dental clutch former to the patient's lower teeth; and,
    (h) a second center bearing plate adjustably connected to the second front section side railings, the second center bearing plate having a height adjustment element for engaging said concave undersurface portion to regulate the distance between the upper and lower dental clutch formers.

7. The structure according to claim 6, in which the first side railings and second side railings are connected for longitudinal sliding movement relative to the first and second front sections respectively so that the dental clutch formers can be adjusted to the patient's upper and lower teeth.

8. The structure according to claim 7, in which there is provided:
    a first mounting block connected to the first front section;
    a first removable stud connected to the first mounting block;
    a second mounting block connected to the second front section; and,
    a second removable stud connected to the second mounting block, the studs being usable to fix the upper and lower dental clutch formers in desired relative positions.

9. The structure according to claim 8, in which:
    the side railings and center bearing plates are constructed from flexible material,
    the rearward sections of the first and second center bearing plates are laterally offset and spaced from one another enabling the dental clutch formers to be brought into mutual close proximity, and,
    means is included defining retention openings in the upper and lower dental clutch formers for holding moldable plastic in place as it is being cured.

References Cited

UNITED STATES PATENTS 3,431,649  3/1969  Guichet _____ 32—20

FOREIGN PATENTS 338,924  6/1959  Italy _____ 32—20

R. PESHOCK, Primary Examiner